(12) United States Patent
Filkovski et al.

(10) Patent No.: US 8,056,390 B2
(45) Date of Patent: Nov. 15, 2011

(54) PARTIAL STROKE TESTING WITH PULSED CONTROL LOOP

(75) Inventors: Gregory T. Filkovski, Muncie, IN (US); Jeremy Lewis, Muncie, IN (US); David S. Neff, Yorktown, IN (US); Brice Hyatt, Markleville, IN (US)

(73) Assignee: Honeywell International Inc., Morristown, NJ (US)

( * ) Notice: Subject to any disclaimer, the term of this patent is extended or adjusted under 35 U.S.C. 154(b) by 652 days.

(21) Appl. No.: 12/235,377

(22) Filed: Sep. 22, 2008

(65) Prior Publication Data

US 2010/0071457 A1 Mar. 25, 2010

(51) Int. Cl.
*G01N 7/20* (2006.01)
(52) U.S. Cl. .......................................... 73/1.72; 73/168
(58) Field of Classification Search .................. None
See application file for complete search history.

(56) References Cited

U.S. PATENT DOCUMENTS

| | | | |
|---|---|---|---|
| 5,030,939 A * | 7/1991 | Lovick | 340/500 |
| 6,789,563 B2 | 9/2004 | Filkovski et al. | |
| 6,805,328 B2 | 10/2004 | Filkovski et al. | |
| 2002/0145515 A1 * | 10/2002 | Snowbarger et al. | 340/514 |

OTHER PUBLICATIONS

Holtgraver, Ed; Article entitled "Emergency Shutdown Valves: Options for Partial Stroke Testing"; Summer 2008 edition of Valve Magazine; pp. 28-33.
Anonymous; "Mechanical Limit Switches"; Engineers Edge website —http://www.engineersedge.com/instrumentation/limit_switches.htm, 2001-2008.

* cited by examiner

*Primary Examiner* — Robert Raevis
(74) *Attorney, Agent, or Firm* — Barnes & Thornburg LLP (57) ABSTRACT

Partial Stroke Testing (PST) equipment and methodologies provide PST data for one or more valves by withholding or applying power to the one or more valves for periodic time periods that increase by an incremental amount until the one or more valves partially stroke or a maximum test period expires.

20 Claims, 7 Drawing Sheets

PARTIAL STROKE TESTING WITH PULSED CONTROL LOOP

BACKGROUND

The present disclosure relates to Partial Stroke Testing (PST) of a shut-off valve apparatus and particularly to PST using a control loop to test operation of an Emergency Safety Device (ESD) such as a rapid-closing shut-off valve apparatus.

SUMMARY

According to the present disclosure, a PST methodology and equipment are provided wherein a valve assembly to be tested is subjected to increasing periods of time with or without power in a pulsing manner until corresponding valve member movement occurs. If movement occurs within a specified period of time, the valve assembly passes the PST.

In illustrative embodiments, the period time during which power is either withheld or applied is increased so as to perform PST analysis while minimizing the degree of stroking for the subject valve assembly.

In illustrative embodiments, the time period for movement and the amount of movement are both monitored so as to generate PST data that may be utilized for diagnostics and analyzed for the existence of trends.

Additional features of the disclosure will become apparent to those skilled in the art upon consideration of the following detailed description of illustrated embodiments exemplifying the best mode of carrying out the disclosure as presently perceived.

BRIEF DESCRIPTION OF THE DRAWINGS

The detailed description particularly refers to the accompanying figures in which.

DETAILED DESCRIPTION OF EMBODIMENTS

It should be understood that illustrated embodiments have particular utility in performing diagnostics regarding conventional shut-off valves that open and close to control material flow in a conduit or piping system. The opening and closing of some known shut-off valves are controlled by pneumatic and/or electrical signals. Some conventional shut-off valves, such as those included in piping systems though which combustible fuel is delivered, are configured to close very rapidly. Rapid closing in such valves is desirable, for example, when an alarm condition is present or if electrical or pneumatic inputs to the valve are severed or otherwise lost. In such situations, rapid-closing shut-off valves are routinely used to comply with the real-time shutoff requirements necessary for efficiency and safety.

Because such rapid-closing valves are utilized to respond in an immediate fashion, it should be appreciated that the failure of a rapid-closing valve to close when required can be particularly problematic. Accordingly, various conventional techniques and devices are available for testing of such valves so as to reduce the probability of failure for such valves and the equipment including those valves.

Routinely, emergency shut-off valves are tested during routine maintenance of the system incorporating the valves, which generally involves shutting down a process performed in the system incorporating the valves. The testing of such valves as part of shut down of a process involves what is referred to as "full stroking" of the valve. Full-stroke testing involves completely closing the valve to ensure that the valve will respond to a control to close when necessary, e.g., in an emergency situation.

However, the ability to test valves while a process is in service has greater utility because manufacturing and industrial processes may continue during the testing process. Thus, there are various conventional Partial Stroke Testing (PST) systems and techniques for testing the ability to partially close a valve while a system or process involving the valve is in service.

The theory underlying partial-stroke techniques is both diagnostic and preventative. First, in some failure modes, there is a likelihood that a valve failure may be diagnosed as easily using partial-stroke testing as in full-stroke testing because some modes of valve failures result from a valve becoming frozen or stuck in one position as a result actuator sizing is insufficient to actuate valve under certain conditions, e.g., valve packing is seized or tight, air line to actuator is crimped or blocked, a valve stem sticks or a valve seat is scarred, contains debris or is plugged due to deposition or polymerization. Moreover, routine maintenance using partial-stroke techniques can potentially help prevent some valve failure modes relating to frozen or stuck valves.

Conventional rapid-close valves typically include a main solenoid valve, an exhaust valve and a pneumatic actuator. In response to a "trip" signal (i.e., control signal controlling operation of the valve), a pneumatic valve assembly de-energizes triggering the exhaust valve to vent the pneumatic actuator and close the main pneumatic valve. Thus, when such a valve assembly is used as a fast-closing shut-off valve, the valve is energized when a processing system including the valve is operational; likewise, in the event of a trip signal, the valve is de-energized and the valve is controlled to close, thereby stopping the process occurring in the processing system.

Such conventional safety shut off valve assemblies routinely include one or more switches used to determine one or more locations of a valve member included in the valve assembly. Accordingly, a valve assembly may include, for example, an open-limit switch positioned so as to indicate when the valve member is located at the open limit of the valve member's stroke. Likewise, a valve assembly may include, a closed-limit switch positioned so as to indicate when the valve member is located at the closed, limit of the valve member's stroke. Although typically, limit switches are used to provide full open or full shut indications, switches may be positioned in intermediate locations along the valve member's stroke path.

For example, partial stroke switches may be used to determine whether a valve member has moved to a particular location associated with successful partial stroke testing. Regardless of the location, these switches provide signals indicative of the position of the movable valve member of the valve apparatus. Such switches give ON/OFF, or activated/not activated outputs that correspond to an indication that the valve is or is not at the corresponding position, respectively.

However, conventional PST equipment and techniques require specific knowledge of the application and industrial environment wherein the testing is to be performed. Additionally, use of such equipment and techniques requires complicated set up and integration with industrial and manufacturing systems that include the valves to be tested.

Further, some conventional PST techniques merely remove power from a tested valve until the tested valve comes off the limit switch and turns the power back on the valve. More specifically, such techniques utilize the limit switch arrangements to determine position of the valve member while releasing supplied power or pressure as appropriate to achieve a desired PST travel distance of the valve member. In the event that the valve actuator motion occurs too slowly, the test is aborted and an error signal is generated.

Figure 1:
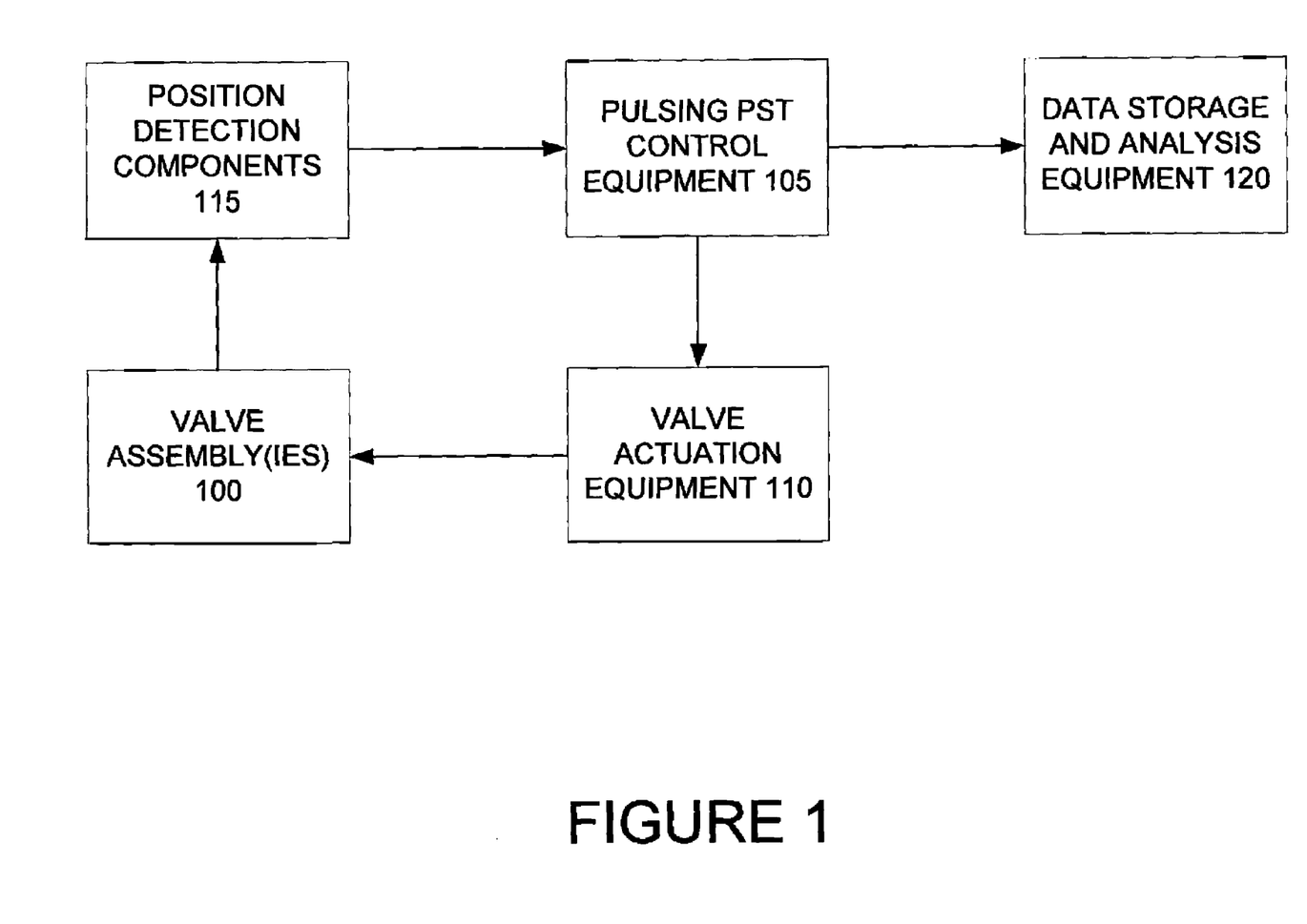
FIG. 1 is a conceptual block diagram illustrating the pulsed control loop approach utilized by illustrated embodiments, wherein, as part of PST, a change of state for a subject valve assembly is repeatedly applied for increasing periods of time so as to trigger movement of the valve member of the valve assembly, and, wherein data indicating corresponding valve member movement is monitored and used to control further testing of the valve.

To the contrary, an illustrated embodiment incorporates a pulsing control loop into a PST methodology to provide improved accuracy and control. FIG. 1 is a conceptual block diagram illustrating the pulsed control loop approach utilized by illustrated embodiments, wherein, as part of PST, the valve assembly 100 is subjected to period of time where power is discontinued in controlled pulses under the direction of the pulsing PST control equipment 105. The valve assembly(ies) 100 are operated via actuation provided by valve actuation equipment that is coupled to, and under at least partial control of, the PST control equipment 105.

Data indicating valve operation responses to those pulses is monitored through the use of position detection components 115, which may include one or more position switches for determining the location of a moving valve member of the assembly 100. That data indicating valve operation responses to those pulses may be transmitted back to the pulsing PST control equipment 105 and be used to control further PST testing of the valve assembly(ies) 100. Additionally, that data may be transmitted to data storage and analysis equipment 120 such as computer memory or computational equipment for analyzing the data so as to log the data and, optionally, provide trend analysis of the data.

Thus, in accordance with an illustrated embodiment, the ON/OFF control of a valve apparatus, such as an emergency shut-off valve or other rapid-closing valve, is manipulated as part of the PST. In conjunction with the pulsing periods of the valve being de-energized, one or more valve member position switches is checked or monitored to determine whether the valve member has responded to the changes in energy levels. Thus, if the one or more valve member position switches do not change state (e.g., change from an activated state to a de-activated state or vice versa), then the pulse period of time (e.g., that period during which power is withheld from the valve assembly) is increased and the test is repeated. This control loop continues until a PST switch makes a change in state or the loop times out after some specified period of time (i.e., maximum trip pulse time).

Illustrated embodiments may have particular utility in testing safety shut off valves utilized in combustion system applications. Such safety shut off valves are required to be rapid-closing for use in combustion applications (see, for example, the valve and valve-related technology disclosed in U.S. Pat. No. 6,789,563 issued Sep. 14, 2004 and U.S. Pat. No. 6,805,328 issued Oct. 19, 2004, the disclosures of which are incorporated by reference in their entireties). However, this concept can be utilized on other pneumatic valves that incorporate rapid response stem travel or request more accurate and controlled response times.

Figure 2:
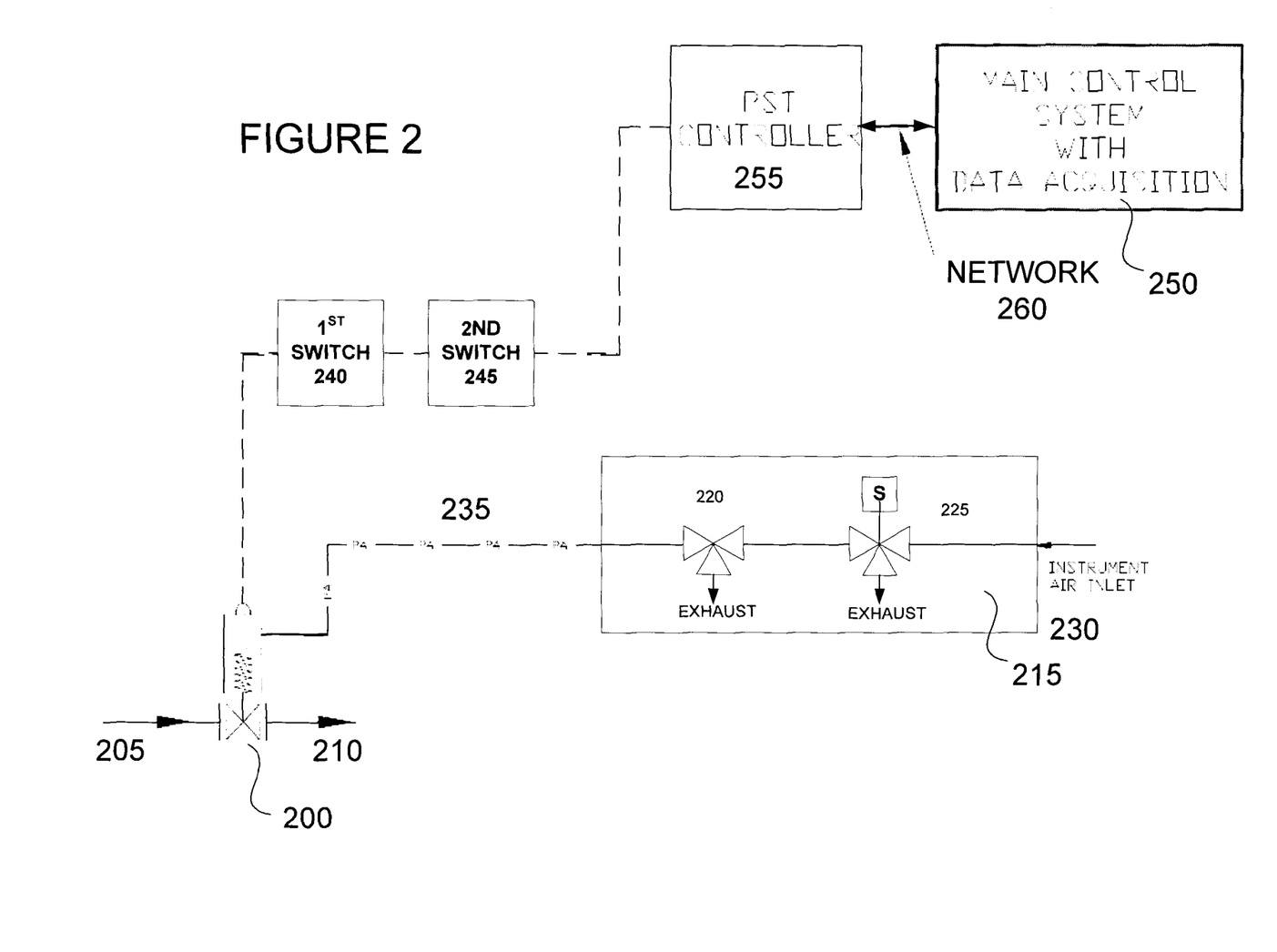
FIG. 2 is an illustrative component diagram showing components of PST equipment embodiment in conjunction with a single valve apparatus and associated valve apparatus operation and control components.

FIG. 2 is an illustrative component diagram showing components of PST equipment embodiment in conjunction with a single valve apparatus and associated valve apparatus operation and control components. As shown in FIG. 2, a subject valve 200 is provided in a process wherein some type of liquid or gas travels there through. Thus, in one example, in the event of an emergency shut off, the valve assembly may be de-energized, thereby triggering the valve to close and discontinue a path between the inlet flow 205 and the outlet flow 210. Such safety shut off valves are required to be rapid closing for use in combustion applications. The rapid acting nature of the closing is provided pneumatically by the pneumatic actuator 215 through a solenoid valve 225 and/or an exhaust valve 220 coupled to the subject valve 200. Pneumatic operation is provided via instrument air inlet 230 to provide pneumatic air 235 to the subject valve 200.

Typically, conventional safety shut off valves have optional valve member position switches, for example, valve open limit switches, valve closed limit, partial stroke switches, etc. Such switches, or external valve member position sensors may be utilized in conjunction with the pulsed control loop PST of the illustrated embodiments. Therefore, as illustrated in FIG. 2, a plurality of switches 240 and 245 may be utilized to generate position data to indicate a location of a valve member during the PST. In one implementation, the first switch 240, may be, for example, a valve open switch and the second switch 245, may be for example, a valve closed switch. It should be appreciated that, if redundancy is of interest, each of the first and second switches 240, 245 may have counterpart backup switches (not shown) to confirm data or serve as a backup in case of switch failure.

The main control system 250 is in communication with the PST controller 255 so as to cooperate to control performance of various PST operations (for example, those operations illustrated in FIG. 4, explained herein); this communication may be performed via network 260, which may be implemented in whole or in part as an Ethernet, wireless or wired communication network. Thus, the main control system 250 may provide instruction to the PST controller 255 to perform PST operations, wherein the PST controller 255 may be implemented, for example, in whole or in part in logic programmed into a Programmable Logic Controller (PLC) or other programmable microprocessor device(s) that can be incorporated on a printed circuit board.

The main control system 250 may include data acquisition capability that allows the PLC controller 255 to forward switch data to the control system 250 (or for the switches 240, 245 to directly transmit that data to the control system 250) As indicated in FIG. 2, the dashed line that connects the subject valve 200 to the switches 240, 245 and the PST controller 255 may be indicative of one or more types of interconnections for providing, for example, power as well as data in a unidirectional or bidirectional manner.

Most combustion installation codes require two safety-shut off valves in the piping for redundant safety. Therefore, FIG. 3 is an illustrative component diagram showing components of PST equipment embodiment in conjunction with a double block valve apparatus and associated valve apparatus operation and control components.

Like the configuration illustrated in FIG. 2, subject valves 300, 305 are provided in a process wherein some type of liquid or gas travels there through. Thus, in one example, in the event of an emergency shut off, the valve assemblies may be de-energized, thereby triggering the valves 300, 305 (one or preferably both) to close and discontinue a path from the inlet flow 310, the intermediate path 315 between the subject valves 300, 305 and the outlet flow 320. Such safety shut off valves are required to be rapid closing for use in combustion applications.

The rapid acting nature of the closing is provided pneumatically by the valve actuator 325 through a solenoid valve 335 and a quick exhaust valve 330 coupled to the subject valves 300, 305. Pneumatic operation of the subject valves 300, 305 is provided via instrument air inlet 340 to provide pneumatic air 345 to the subject valves 300, 305.

Figure 3:
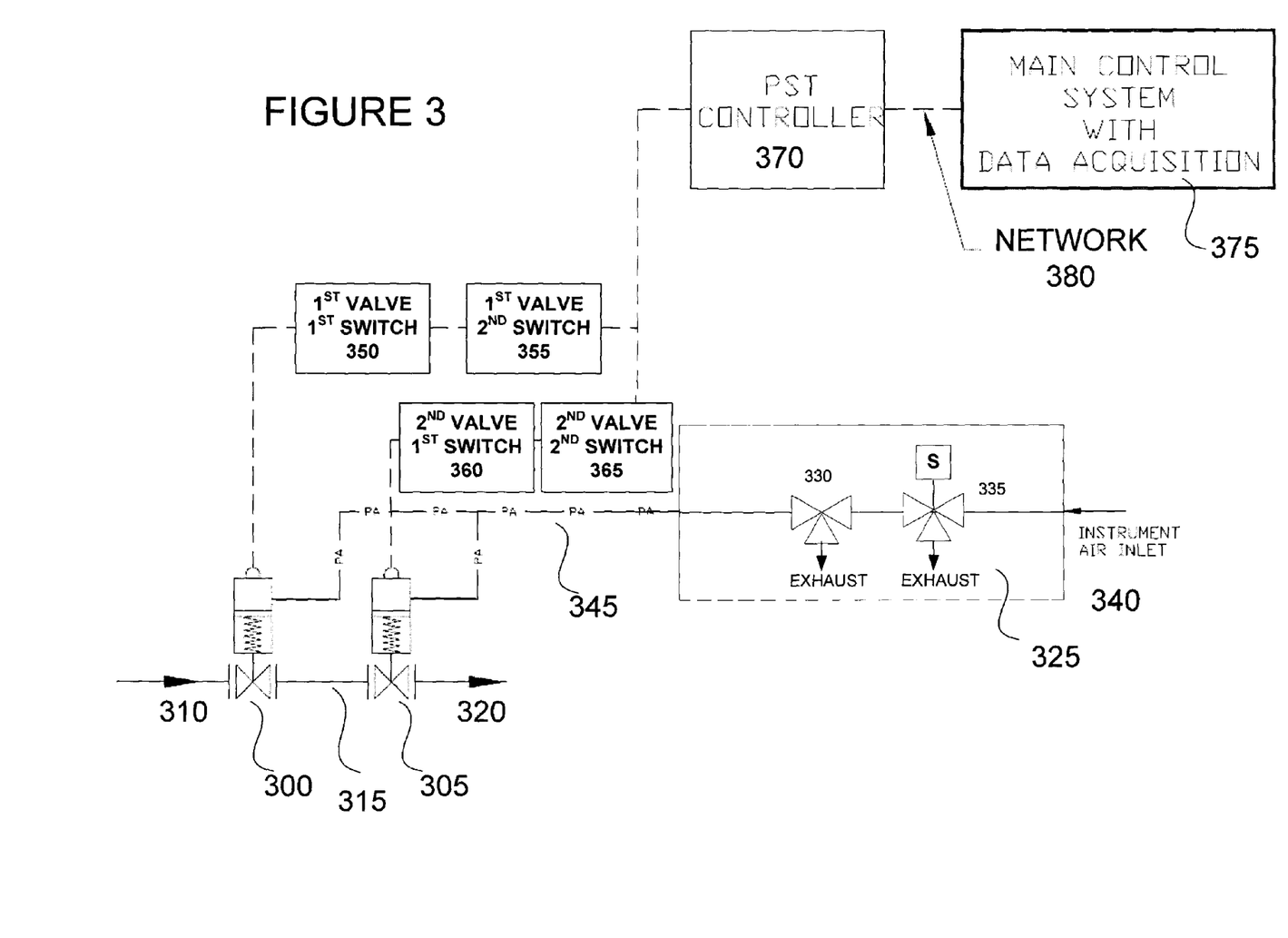
FIG. 3 is an illustrative component diagram showing components of PST equipment embodiment in conjunction with a double block valve apparatus and associated valve apparatus operation and control components.

Similar to the configuration illustrated in FIG. 2, FIG. 3 includes a plurality of switches 350, 355 associated with the first valve 300 and a plurality of switches 360, 365 associated with the second valve 305 that may be utilized to generate position data to indicate a location of valve members included in the valve assemblies 300, 305, respectively during the PST. Thus, in one implementation, the first switch 350 of the first valve 300, may be, for example, a valve open switch and the second switch 355 of the first valve 300, may be for example, a valve closed switch. Likewise, the first switch 360 of the second valve 305, may be, for example, a valve open switch and the second switch 365 of the second valve 305, may be for example, a valve closed switch. It should be appreciated that, if redundancy is of interest, each of the first and second switches for each of the valves 300, 305 may have counterpart backup switches (not shown) to confirm data or serve as a backup in case of switch failure.

Figure 4:
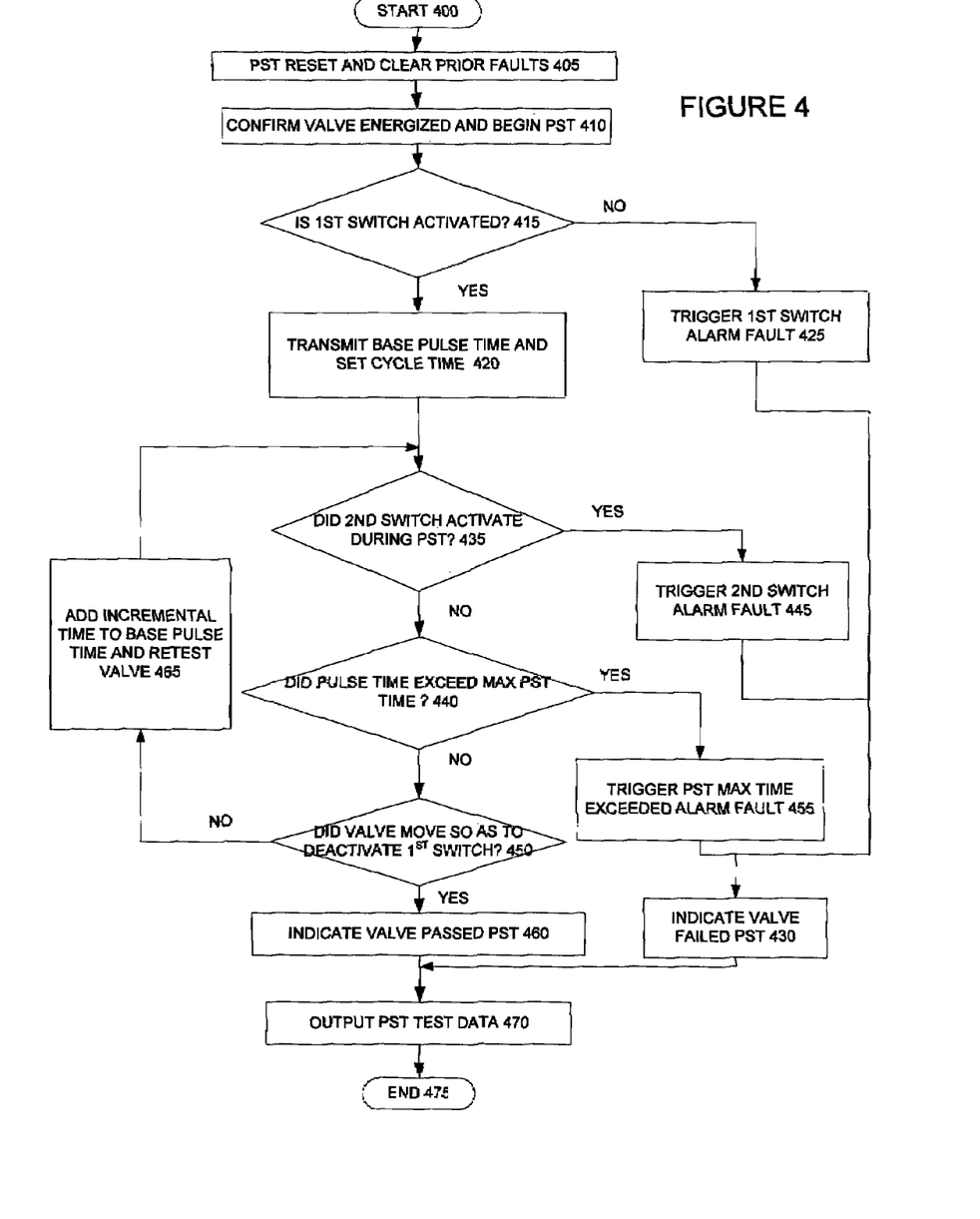
FIG. 4 is a flow chart illustrating various operations performed as part of a PST methodology for a single valve apparatus, as provided in accordance with an illustrated embodiment.
Figure 5:
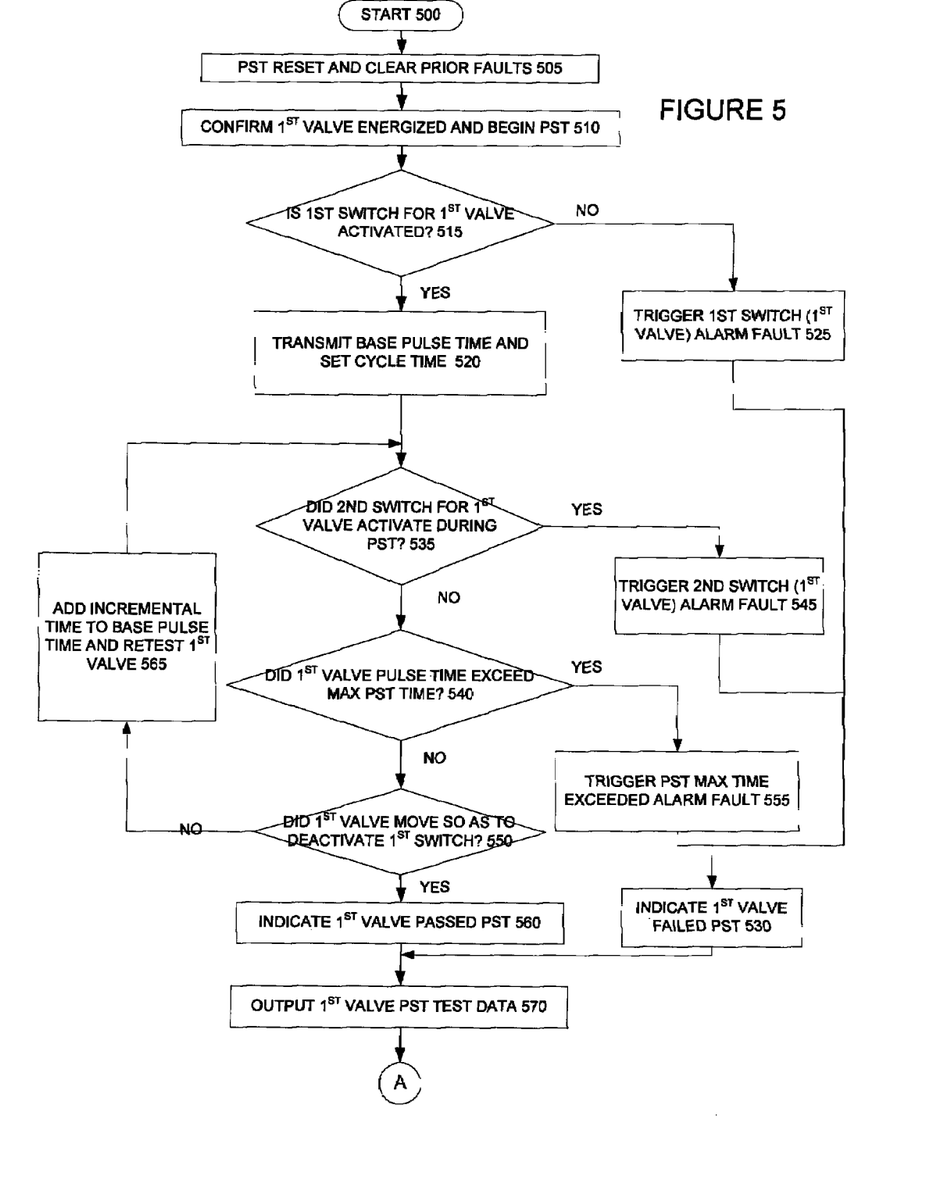
FIGS. 5-6 collectively provide a single flow chart illustrating various operations performed as part of a PST methodology for a double block valve apparatus, as provided in accordance with an illustrated embodiment.
Figure 6:
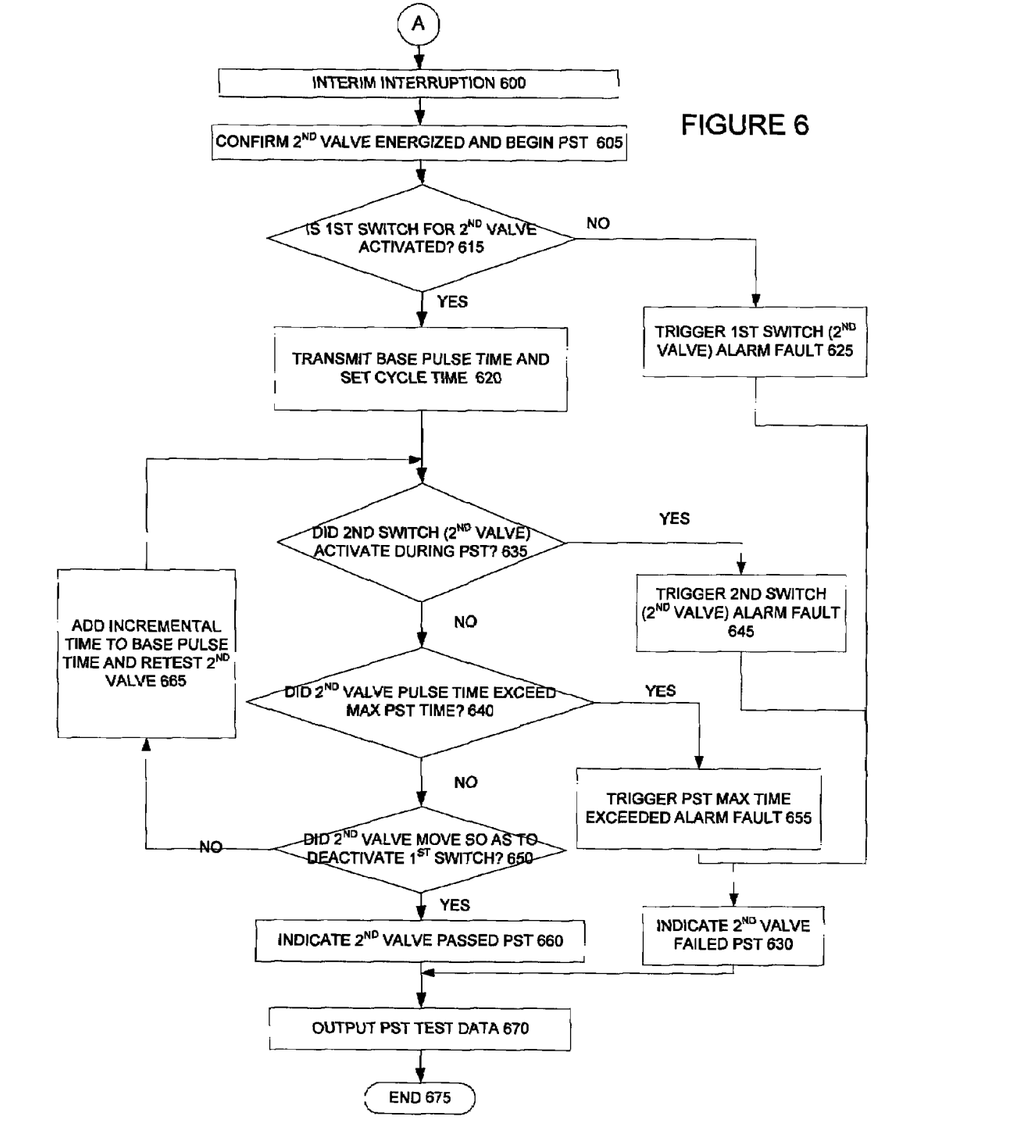

The main control system 375 is in communication with the PST controller 370 so as to cooperate to control performance of various PST operations (as explained herein with reference to FIGS. 4-6; this communication may be performed via network 380, which may be implemented in whole or in part as an Ethernet, wireless or wired communication network. Thus, the main control system 375 may provide instruction to the PST controller 370 to perform PST operations, wherein the PST controller 370 may be implemented, for example, in whole or in part in logic programmed into a Programmable Logic Controller (PLC) or other programmable microprocessor device(s) that can be incorporated on a printed circuit board.

The main control system 375 may include data acquisition capability that allows the PLC controller 370 to forward switch data to the control system 375 (or for the switches 350-365 to directly transmit that data to the control system 375) As indicated in FIG. 3, the dashed line that connects the subject valves 300, 305 to the switches 350-365 and the PST controller 370 may be indicative of one or more types of interconnections for providing, for example, power as well as data in a unidirectional or bidirectional manner.

FIG. 4 is a flow chart illustrating various operations performed as part of a PST methodology for a single valve apparatus, as provided in accordance with an illustrated embodiment. As shown in FIG. 4, operations may begin at 400 and continue to 405, at which the PST system is reset and any fault alarms generated from previous PST testing are cleared. Control then proceeds to 410, at which it is confirmed that the valve is energized and the PST is begun for the subject valve.

It should be understood that, although the embodiments are being explained with reference to a normally closed energized valve assembly; for example, the valve assembly is receiving power during normal process operation and, in the event of an emergency, the valve assembly is de-energized, thereby triggering the movable valve member of the valve assembly to either close or open depending on the configuration. However, it should be understood that the PST testing may be performed just as easily for a configuration wherein emergency shut off triggers power to the valve to open or close the valve assembly. In such an implementation, operations performed at 410 may confirm that the subject valve is "de-energized."

Returning to FIG. 4, following confirmation of the energized state of the valve, it is determined whether the first switch is activated at 415. As explained above, the first switch may be any type of position sensor that indicates (in a binary manner, i.e., ON/OFF) whether the valve member for the subject valve is located at a position associated with the switch. For the purposes of illustration only, presume that the first switch is a valve open limit switch for example. Thus, the first switch would be activated if the valve member were located at the open limit for the valve; if the first switch were not activated, the switch would indicate that the valve member was not located at the open limit for the valve, i.e., the valve was only partially open.

The location of one or more switches along the valve stroke path is not determinative of the utility or novelty of the invention. Rather, the one or more switches are provided in a manner meant to indicate and register movement of the valve member in response to pulses of power for escalating periods of duration.

Presuming that the first switch is a valve open limit switch, a determination at 415 that the first switch is activated provides an indication that the subject valve is fully open, which is necessary in order to perform accurate PST diagnostics. Accordingly, if it is determined that the first switch is activated, control proceeds to 420, at which the PST diagnostics continue. If it is determined that the first switch is not activated (and activation indicates a fully opened valve), the determination may be an indication that the valve is partially closed. In such a situation, the process including the subject valve may be operational but the subject valve's stroke may be limited due to valve damage or deterioration. Regardless of the cause, a subject valve that is not fully open cannot be effectively evaluated using PST diagnostics. Accordingly, if the first switch is not activated at 415, control proceeds to 425 at which a first switch alarm fault is triggered. Such an alarm may indicate, for example, that the subject valve is not capable of a fully open position and requires maintenance. Subsequently, control may proceed to 430, at which an indication of a PST failure is generated for the valve.

Alternatively, if the first switch is activated at 415, control proceeds to 420, at which the cycle time for PST diagnostics is set and further pulsing of the subject valve is applied using a theoretical base pulse time for the subject valve. As referred to at 420, the base pulse time is the initial period of time during which the subject valve will be de-energized so as to, theoretically, trigger movement of the subject valve's member from an open position. Likewise, the cycle time is the period of time separating successive periods of de-energizing of the valve. The cycle time remains constant throughout the PST.

Control proceeds to 435, at which it is determined whether a second switch is activated during the base pulse time. For the purposes of illustration only, the second switch may be, for example, a closed limit switch indicating that the valve member is in a fully closed position. In such an example, if it is determined that the second switch is activated at 435 (indicating, for example, a full stroke), control proceeds to 445, at which a second switch alarm fault is triggered; this alarm fault may, in this example, indicate that the subject valve should be further evaluated for failure (e.g., in full stroking too quickly). Alternatively, the alarm fault may be an indication that the theoretically calculated base pulse period (discussed below with reference to FIG. 7) is actually too long because it is resulting in movement greater than a partial stroke of the subject valve.

It should be appreciated that the theoretical base pulse period may be set so as to be shorter than any likely PST time for a subject valve. Therefore, the base pulse period used at 435 may be set to be, for example, 10 milliseconds, which is likely shorter than any PST time for a subject valve regardless of the application and structural variables of the valve. By utilizing this approach, an amount of initial service start up time for performing PST diagnostics may be reduced while accounting for most if not all the application variables that can affect the PST time period settings.

Some of the variables that affect the PST time data for valves include valve size, valve type, line pressure and pneumatic air pressure to the actuator. By implementing the operations performed at 435 and 445, a theoretical base pulse time can be set smaller then a minimum PST time associated with a given valve or valve model. As a result, little to no set up time is required.

Thus, because the base pulse time period may be set based on theoretical modeling of the characteristics of the subject valve, there is a possibility that the base pulse time period is not of a length appropriate for PST diagnostics. That would be the case if the second switch was an open limit switch and, at 435, it was determined that the second switch was activated as a result of the de-energizing of the valve for the theoretical base pulse time period. In such a situation, the base pulse time period may need to be adjusted to perform PST because PST diagnostics require that the base pulse time period be set such the valve member does not experience a full stroke during the base pulse time period.

This ability to determine whether a subject valve is stroking to fast or that a base pulse period utilized in the PST diagnostics may have particular utility because various embodiments may be used in testing safety shut off valves utilized in combustion system applications. Such applications use burners that require steady and uninterrupted gas flow to the burner nozzle even if a PST analysis is being performed. In illustrated embodiments, the stroke of the rapid closing valve may be effectively limited so as to minimize the change in gas flow when the PST diagnostics are performed. This is because conventional PST equipment, such as that disclosed in U.S. Pat. No. 6,435,022, if applied to rapid closing valves in combustion applications may excessively stroke the valve to travels that could compromise burner performance or result in unsafe combustion operation. By implementing illustrated embodiments disclosed herein, such excessive stroking may minimized or eliminated.

Returning to FIG. 4, following generation of the alarm fault, control proceeds to 430, at which an indication that the PST diagnostics have failed is generated. Alternatively, if the second switch did not activate at 435, further operations are performed for providing an escalating and repetitive cycle of PST diagnostics. More specifically, the operations performed at 435, 440, 450 and 465 constitute a repeating cycle, wherein the subject valve is de-energized for periods of time that become progressively longer as the cycle repeats. The pulse period of de-energizing of the valve increases by an incremental value (e.g., 1 millisecond, 5 milliseconds, etc.) beginning at the base pulse time (as explained herein in more detail with reference to FIG. 7). Therefore, for each cycle of operations performed at 435, 440, 450 and 465 (explained herein) the period of de-energizing increases by an incremental period of time (constant) until: (1) corresponding movement of the valve member is registered; or (2) a maximum PST pulse time is exceeded.

Therefore, at 440, it is determined whether the pulse time period (be it the base pulse period or augmented by incremental periods) exceeds the maximum PST pulse time set for the PST diagnostics. Such a maximum PST pulse time may be, for example, 300 milliseconds 500 milliseconds, etc. However, it should be appreciated that both the maximum PST pulse time and the base pulse time may be set so as to provide a range of time values that likely include any likely PST time exhibited by a subject valve. Again this approach allows an amount of initial service start up time for performing PST diagnostics to be reduced while accounting for most if not all the application variables that can affect the PST time period settings.

If, at 440, it is determined that the pulse time period exceeds the maximum PST pulse time, control proceeds to 455 at which an alarm fault is generated indicating that the PST maximum time has been exceeded. Such may occur, for example, when after repeated de-energized pulses of increasing duration testing the subject valve member has not moved. Following such an alarm, the subject valve may be identified for further diagnostics to determine why the subject valve is not functioning as expected. Accordingly, control proceeds to 430, at which an indication that the PST diagnostics have failed is generated.

If, at 440, it is determined that the pulse time period does not exceed the maximum PST pulse time, control proceeds to 450, at which it is determined whether the valve member has moved in response to the base pulse time period of de-energizing. This is determined based on whether the first switch (in this example, indicating a fully open valve) has de-activated (indicating something other than a fully open valve, which is a successful result from a PST diagnostic). If the first switch has de-activated, the subject valve has passed the PST. Therefore, control proceeds to 460 at which an indication that the subject valve has passed PST diagnostics is generated.

If, at 450, it is determined that the first switch has not been de-activated (in this example, indicating no movement from the valve fully open position), control proceeds to 465, at which an incremental time period is added to the base pulse time (or last tested pulse time if this iteration of operations at 435, 440, 450 and 465 is not an initial iteration). Subsequently, the subject valve is subjected to a longer period of de-energizing in an effort to trigger a successful PST response from the subject valve. It should be understood that, although not illustrated in the FIG. 4 (or FIGS. 5-6), a cycle time period, such as, for example, 500 milliseconds, elapses between each pulse period so as to provide a periodic but escalating period for the de-energized state of the subject valve.

Following generation of an indication of a successful PST test for the subject valve at 465, control proceeds to 470, at which PST test data are output for storage and further analysis. Effective PST of ESD valves provides data that determines whether a valve will safely shut down when required as well. By utilizing illustrated embodiments, PST can also provide PST times (the actual time the PST was successful). These PST times provide additional diagnostic capability when this data is logged over time to and analyzed for the existence of trends. For example, if the PST time increases throughout the valves service, the need for valve maintenance or replacement can be predicted and scheduled prior to valve failure.

As illustrated in FIGS. 1-6, the PST time data can be transmitted to a controller or other memory or computational device for logging the information and use for diagnostic analysis. Again, by utilizing the incremental time addition, not only is the valve stroke more controlled but the PST time is more accurate. Therefore, more accurate diagnostic information is available through use of the illustrated embodiments.

Figure 7:
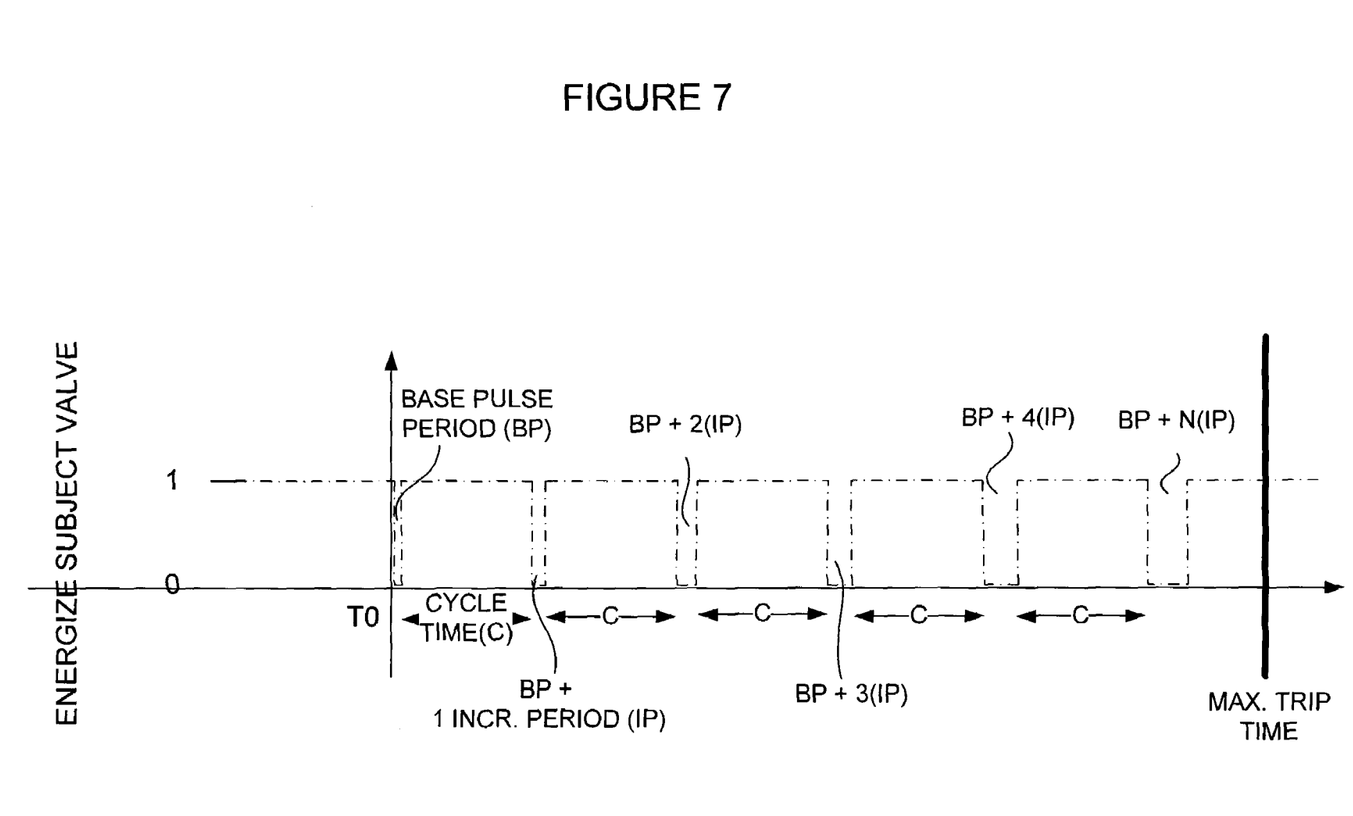
FIG. 7 is an illustrative graph depicting a potential relationship between a base pulse time period, an incremental period, a cycle time period and a maximum trip time period.

FIG. 7 is an illustrative graph (not to scale) depicting a potential relationship between a base pulse time period, an incremental period, a cycle time period and a maximum trip time period. The operations performed at 435, 440, 450, and 465 of FIG. 4 constitute a repeating cycle, wherein the subject valve is de-energized for periods of time that become progressively longer as the cycle repeats. As illustrated in FIG. 7, the pulse period of de-energizing of the valve increases by an incremental value (e.g., 1 millisecond, 5 milliseconds, etc.) beginning at the base pulse time BP. To provide the pulsing effect, pulse times are separated from one another by a cycle time C, which may be constant value (e.g., 500 milliseconds). For each cycle of operations performed at 435, 440, 450, and 465 of FIG. 4, the time period of de-energizing increases by an incremental period IP (e.g., a constant value such as 1 ms). This repeated set of operations is allowed to continue until there is a corresponding movement of the subject valve member. However, a maximum PST test time, illustrated as max. trip time set so as to discontinue the PST diagnostics if no movement of the subject valve member has occurred by that time. This maximum PST test time or PST diagnostic period may be, for example, 300 milliseconds.

It should be understood that each of the base pulse BP, incremental period IP and the maximum PST time may be set so as to take into consideration all or substantially all of the variables effecting PST time (i.e., the response time for the valve to partially stroke and pass the PST diagnostics). For example, the maximum PST test time may be set to be larger than a theoretically modeled maximum PST time possible for a particular valve, valve model, application, associated process, etc. As a result, the maximum trip time can be greater than any likely PST time so as to account for all or substantially all of the application variables on a high end of a range of likely PST times. Moreover, the base pulse time can be set to be less than any likely PST time so as to account for all or substantially all of the application variables on a low end of a range of likely PST times. Therefore, if a likely PST time range is between 50-100 milliseconds, then the base pulse period BP could be set to 30 milliseconds and the maximum PST test time may be set to 300 milliseconds.

Further, the incremental period IP may be set as a relatively small increment, e.g., 1 millisecond, in comparison to the base pulse period BP and maximum PST test time. This may result in a particularly accurate measurement of the PST time for a subject valve. Such accuracy may be particularly useful if, for example, the PST diagnostic data is being analyzed to determine trends in PST diagnostic response so as to anticipate maintenance and repair issues. Alternatively, if the PST diagnostic is performed primarily to determine a pass/fail status for the subject valve, the incremental period IP may be set larger.

As stated above, most combustion installation codes require two safety-shut off valves in the piping for redundant safety. Therefore, FIGS. 5-6 collectively provide a single flow chart illustrating various operations performed as part of a PST methodology for a double block valve apparatus, as provided in accordance with an illustrated embodiment.

As shown in FIG. 5, operations may begin at 500 and continue to 505, at which the PST system is reset and any fault alarms generated from previous PST testing are cleared. Control then proceeds to 510, at which it is confirmed that a first valve in the double block valve apparatus is energized and the PST for the first valve is begun for the first valve.

Following confirmation of the energized state of the first valve, it is determined whether the first switch for the first valve is activated at 515. Again, for the purposes of illustration only, presume that the first switch is a valve open limit switch for example. Thus, the first switch would be activated if the valve member were located at the open limit for the first valve; if the first switch were not activated, the switch would indicate that the valve member was not located at the open limit for the first valve, i.e., the first valve was only partially open. The location of one or more switches along the valve stroke path is not determinative of the utility or novelty of the invention. Rather, the one or more switches are provided in a manner meant to indicate and register movement of the valve member in response to pulses of power for escalating periods of duration.

Presuming that the first switch is a valve open limit switch, a determination at 515 that the first switch for the first valve is activated provides an indication that the first valve is fully open, which is necessary in order to perform accurate PST diagnostics. Accordingly, if it is determined that the first switch for the first valve is activated, control proceeds to 520, at which the PST diagnostics continue. If it is determined that the first switch is not activated, the determination may be an indication that the first valve is partially closed. Accordingly, if the first switch for the first valve is not activated at 515, control proceeds to 525 at which a first switch alarm fault is triggered. Such an alarm may indicate, for example, that the first valve is not capable of a fully open position and requires maintenance. Subsequently, control may proceed to 530, at which an indication of a PST failure is generated for the first valve.

Alternatively, if the first switch is activated at 515, control proceeds to 520, at which the cycle time for PST diagnostics is set and further pulsing of the first valve is applied using a theoretical base pulse time for the first valve. Control proceeds to 535, at which it is determined whether a second switch for the first valve is activated during the base pulse time. For the purposes of illustration only, the second switch may be, for example, a closed limit switch indicating that the valve member for the first valve is in a fully closed position. In such an example, if it is determined that the second switch is activated at 535 (indicating, for example, a full stroke), control proceeds to 545, at which a second switch alarm fault is triggered; this alarm fault may, in this example, indicate that the first valve should be further evaluated for failure (e.g., in full stroking too quickly) or may indicate that the base pulse period for the first valve is actually too long because it is resulting in movement greater than a partial stroke of the first valve.

Following generation of the alarm fault, control proceeds to 530, at which an indication that the first valve PST diagnostics have failed is generated. Alternatively, if the second switch did not activate at 535, further operations are performed for providing an escalating and repetitive cycle of PST diagnostics for the first valve. More specifically, as in FIG. 4, the operations performed at 535-550 constitute a repeating cycle, wherein the subject valve is de-energized for periods of time that become progressively longer as the cycle repeats.

Therefore, at 540, it is determined whether the pulse time period (be it the base pulse period or augmented by incremental periods) exceeds the maximum PST pulse time set for the PST diagnostics. If, at 540, it is determined that the pulse time period exceeds the maximum PST pulse time, control proceeds to 555 at which an alarm fault is generated indicating that the PST maximum time has been exceeded. Following such an alarm, the subject valve may be identified for further diagnostics to determine why the subject valve is not functioning as expected. Accordingly, control proceeds to 530, at which an indication that the PST diagnostics have failed is generated.

If, at 540, it is determined that the pulse time period does not exceed the maximum PST pulse time, control proceeds to 550, at which it is determined whether the first valve member has moved in response to the base pulse time period of de-energizing. This is determined based on whether the first switch for the first valve (in this example, indicating a fully open valve) has de-activated (indicating something other than a fully open valve, which is a successful result from a PST diagnostic). If the first switch for the first valve has de-activated, the subject valve has passed the PST. Therefore, control proceeds to 560 at which an indication that the first valve has passed PST diagnostics is generated.

If, at 550, it is determined that the first switch for the first valve has not been de-activated (in this example, indicating no movement from the valve fully open position), control proceeds to 565, at which an incremental time period is added to the base pulse time (or last tested pulse time if this iteration of operations at 535-550 is not an initial iteration). Subsequently, the first valve is subjected to a longer period of de-energizing in an effort to trigger a successful PST response from the first valve.

Following generation of an indication of a successful PST test for the first valve at 565, control proceeds to 570, at which PST test data for the first valve are output for storage and further analysis. Subsequently, PST diagnostic operations are performed for the second valve of the double valve block assembly.

As shown in FIG. 6, operations may begin at 600 and continue to 605, at which the PST system is reset and any fault alarms generated from previous PST testing are cleared. Control then proceeds to 610, at which it is confirmed that a second valve in the double block valve apparatus is energized and the PST for the second valve is begun for the second valve.

Following confirmation of the energized state of the second valve, it is determined whether the first switch for the second valve is activated at 615. Again, for the purposes of illustration only, presume that the first switch is a valve open limit switch for example. Thus, the first switch would be activated if the valve member were located at the open limit for the second valve; if the first switch were not activated, the switch would indicate that the valve member was not located at the open limit for the second valve, i.e., the second valve was only partially open. The location of one or more switches along the valve stroke path is not determinative of the utility or novelty of the invention. Rather, the one or more switches are provided in a manner meant to indicate and register movement of the valve member in response to pulses of power for escalating periods of duration.

Presuming that the first switch is a valve open limit switch, a determination at 615 that the first switch for the second valve is activated provides an indication that the second valve is fully open, which is necessary in order to perform accurate PST diagnostics. Accordingly, if it is determined that the first switch for the second valve is activated, control proceeds to 620, at which the PST diagnostics continue. If it is determined that the first switch is not activated, the determination may be an indication that the second valve is partially closed. Accordingly, if the first switch for the second valve is not activated at 615, control proceeds to 625 at which a first switch alarm fault is triggered. Such an alarm may indicate, for example, that the second valve is not capable of a fully open position and requires maintenance. Subsequently, control may proceed to 630, at which an indication of a PST failure is generated for the second valve.

Alternatively, if the first switch is activated at 615, control proceeds to 620, at which the cycle time for PST diagnostics is set and further pulsing of the second valve is applied using a theoretical base pulse time for the second valve. Control proceeds to 635, at which it is determined whether a second switch for the second valve is activated during the base pulse time. For the purposes of illustration only, the second switch may be, for example, a closed limit switch indicating that the valve member for the second valve is in a fully closed position. In such an example, if it is determined that the second switch is activated at 635 (indicating, for example, a full stroke), control proceeds to 645, at which a second switch alarm fault is triggered; this alarm fault may, in this example, indicate that the second valve should be further evaluated for failure (e.g., in full stroking too quickly) or may indicate that the base pulse period for the second valve is actually too long because it is resulting in movement greater than a partial stroke of the second valve.

Following generation of the alarm fault, control proceeds to 630, at which an indication that the second valve PST diagnostics have failed is generated. Alternatively, if the second switch did not activate at 635, further operations are performed for providing an escalating and repetitive cycle of PST diagnostics for the second valve. More specifically, as in FIG. 4, the operations performed at 635-650 constitute a repeating cycle, wherein the subject valve is de-energized for periods of time that become progressively longer as the cycle repeats.

Therefore, at 640, it is determined whether the pulse time period (be it the base pulse period or augmented by incremental periods) exceeds the maximum PST pulse time set for the PST diagnostics. If, at 640, it is determined that the pulse time period exceeds the maximum PST pulse time, control proceeds to 655 at which an alarm fault is generated indicating that the PST maximum time has been exceeded. Following such an alarm, the subject valve may be identified for further diagnostics to determine why the subject valve is not functioning as expected. Accordingly, control proceeds to 630, at which an indication that the PST diagnostics have failed is generated.

If, at 640, it is determined that the pulse time period does not exceed the maximum PST pulse time, control proceeds to 650, at which it is determined whether the second valve member has moved in response to the base pulse time period of de-energizing. This is determined based on whether the first switch for the second valve (in this example, indicating a fully open valve) has de-activated (indicating something other than a fully open valve, which is a successful result from a PST diagnostic). If the first switch for the second valve has de-activated, the subject valve has passed the PST. Therefore, control proceeds to 660 at which an indication that the second valve has passed PST diagnostics is generated.

If, at 650, it is determined that the first switch for the second valve has not been de-activated (in this example, indicating no movement from the valve fully open position), control proceeds to 665, at which an incremental time period is added to the base pulse time (or last tested pulse time if this iteration of operations at 635-650 is not an initial iteration). Subsequently, the second valve is subjected to a longer period of de-energizing in an effort to trigger a successful PST response from the second valve.

Following generation of an indication of a successful PST test for the second valve at 665, control proceeds to 670, at which PST test data for the second valve are output for storage and further analysis.

Illustrated embodiments limit and more precisely control the valve stroke by the addition of the incremental time to the base pulse. By controlling the valve stroke more precisely, the amount of valve travel can be reduced or minimized when performing a successful PST diagnostic evaluation, i.e., a PST that results in the tested valve operating as intended. As a result, any adverse affects on the process in which the valve is being used (combustion or otherwise) can also be reduced or minimized.

Although the illustrated embodiments have been described in connection with the testing of a subject valve assembly that is normally closed, it should be understood that the PST equipment and methodologies may also be utilized to test valve assemblies that are normally open. An example of such a valve assembly would be one that is used for emergency venting or redirection of process liquids or gases. In implementing the illustrated embodiments to perform PST analysis on such valve assemblies, it should be understood that power would be removed from the valve assembly for increasing periods of time in a pulsed manner.

Furthermore, it should be appreciated that the number of switches utilized in the PST methodology and equipment is not limited to what has been described herein. Rather, additional switches may be utilized to provide redundancy of data in case a switch fails. Alternatively, or in addition, a single switch (such as the second switch illustrated in FIG. 4) may be utilized to determine valve member position while reducing manufacturing costs when, for example, minimizing the degree of stroking is not particularly important. Likewise, more than two switches may be provided to generate additional data regarding the manner in which the subject valve assembly is operating.

Moreover, it should be appreciated that PST diagnostic data generated in association with the illustrated embodiments may also include additional information regarding the forces acting on the valve(s) and the valve actuation system(s). Therefore, pneumatic air levels, underlying processing levels (e.g., temperature, volume through the valve, etc.) may be monitored and/or stored so as to provide accurate analysis of valve performance.

Illustrated embodiments can easily be used for PST of various conventionally available valves including, for example, the electro-pneumatic shut-off valves such as the Maxon Series 8000 valves available from Maxon Corporation of Muncie, Ind., USA. See, for example, the valve and valve technology disclosed in U.S. Pat. Nos. 6,789,563 and 6,805,328 (incorporated by reference in their entirety) or other rapid acting pneumatic valves.

Conventional partial-stroke testing systems interface with a plant emergency shutdown system controller for generating electrical signals for initiating the test and to a source of pressurized gas such as compressed air for driving the system. PST tests an emergency shut-off valve without fully closing the emergency shut-off valve in response to a signal from the plant emergency shutdown system controller.

In some PST systems, a second solenoid valve is used to bleed off compressed air to move the tested emergency shut-off valve from a fully opened position to a partially closed position. Thus, a closed-limit switch is triggered by the movement of the shut-off valve to indicate whether the bleed off effectively moved the valve to a partially closed position. Additionally, a timer is set to a predetermined time limit so as to terminate the shut-off valve test after a period of time wherein the closed, limit-switch is not triggered.

However, the time period for setting up such systems can be lengthy and procedures complicated. Accordingly, illustrated embodiments, as explained above, may be utilized to shorten configuration periods and reduce complexity to provide improved maintenance and diagnostics.

Although the illustrated embodiments have been described in detail with reference to certain illustrated embodiments, variations and modifications exist within the scope and spirit of the invention as described and defined in the following claims.

Thus, while illustrated embodiments have been outlined above, it is evident that many alternatives, modifications and variations will be apparent to those skilled in the art. For example, although the illustrated embodiments are discussed in conjunction with control of valves in a combustion service environment, it should be understood that the embodiments may be utilized with valves that control, gases, liquids and also solids, for example, pulverized coal. Accordingly, the various embodiments of the invention, as set forth above, are intended to be illustrative, not limiting. Various changes may be made without departing from the spirit and scope of the invention.

As a result, it will be apparent for those skilled in the art that the illustrative embodiments described are only examples and that various modifications can be made within the scope of the invention as defined in the appended claims.

The invention claimed is:

1. A Partial Stroke Testing (PST) equipment configuration comprising:
   means for altering application of power to at least one pneumatic valve in a periodic manner; and
   means for determining one or more locations of a valve member of the at least one pneumatic valve during the alteration in applied power to the at least one pneumatic valve, wherein the period of time during which the applied power is altered varies between successive altered power applications.

2. The PST equipment configuration of claim 1, wherein the period of time during which the applied power is altered progressively increases in duration for each successive altered power application.

3. The PST equipment configuration of claim 1, wherein a period of time during which the applied power is altered progressively increases over a PST diagnostic period.

4. The PST equipment configuration of claim 1, further comprising means for generating PST data indicating whether the at least one pneumatic valve has passed a PST diagnostic.

5. The PST equipment configuration of claim 4, further comprising means for storing PST data indicating whether the at least one pneumatic valve has passed the PST diagnostic.

6. The PST equipment configuration of claim 5, further comprising means for analyzing the PST data to identify trends in the PST data regarding PST diagnostic performance of the at least one pneumatic valve.

7. The PST equipment configuration of claim 1, wherein the means for altering power application withholds power from the at least one pneumatic valve in a periodic manner.

8. The PST equipment configuration of claim 1, wherein the means for altering power application applies power from the at least one pneumatic valve in a periodic manner.

9. The PST equipment configuration of claim 1, wherein the means for altering power application cooperates with the location determination means to test a dual pneumatic valve block apparatus by testing valves of the apparatus serially.

10. A method for performing Partial Stroke Testing for at least one pneumatic valve, the method comprising:
    altering application of power to at least one pneumatic valve in a periodic manner; and
    determining one or more locations of a valve member of the at least one pneumatic valve during the alteration in applied power to the at least one pneumatic valve,
    wherein the period of time during which the applied power is altered varies between successive altered power applications.

11. The PST method of claim 10, further comprising generating PST data indicating whether the at least one pneumatic valve has passed a PST diagnostic.

12. The PST method of claim 10, further comprising storing PST data indicating whether the at least one pneumatic valve has passed the PST diagnostic.

13. The PST method of claim 12, further comprising analyzing the PST data to identify trends in the PST data regarding PST diagnostic performance of the at least one pneumatic valve.

14. The PST method of claim 10, wherein the altering of power application withholds power from the at least one pneumatic valve in a periodic manner.

15. The PST method of claim 10, wherein the altering of power application applies power from the at least one pneumatic valve in a periodic manner.

16. The PST method of claim 10, wherein when testing a dual pneumatic valve block apparatus, valves are tested in a serial manner.

17. A Partial Stroke Testing (PST) equipment configuration comprising:
    means for altering application of power to at least one pneumatic valve in a periodic manner; and
    means for determining one or more locations of a valve member of the at least one pneumatic valve during the alteration in applied power to the at least one pneumatic valve,
    wherein the means for determining one or more locations includes at least two switches, one of which being configured to register a fully open position of the at least one pneumatic valve.

18. A Partial Stroke Testing (PST) equipment configuration comprising:
    means for altering application of power to at least one pneumatic valve in a periodic manner; and
    means for determining one or more locations of a valve member of the at least one pneumatic valve during the alteration in applied power to the at least one pneumatic valve, wherein the means for determining one or more locations includes at least one limit switch configured to register a full limit position of the at least one pneumatic valve.

19. A method for performing Partial Stroke Testing for at least one pneumatic valve, the method comprising:
    altering application of power to at least one pneumatic valve in a periodic manner;
    determining one or more locations of a valve member of the at least one pneumatic valve during the alteration in applied power to the at least one pneumatic valve, and
    progressively increasing the period of time during which the applied power is altered for each successive altered power application.

20. A method for performing Partial Stroke Testing for at least one pneumatic valve, the method comprising:
    altering application of power to at least one pneumatic valve in a periodic manner; and
    determining one or more locations of a valve member of the at least one pneumatic valve during the alteration in applied power to the at least one pneumatic valve,
    wherein the period of time during which the applied power is periodically altered progressively increases over a PST diagnostic period.

* * * * *